(12) United States Patent
Shigyo

(10) Patent No.: US 6,564,641 B1
(45) Date of Patent: May 20, 2003

(54) METHOD FOR MEASURING PRESSURE HIGHER THAN MEASURABLE RANGE OF PRESSURE MEASURING FILM

(75) Inventor: Masao Shigyo, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/568,496

(22) Filed: May 11, 2000

(30) Foreign Application Priority Data

May 11, 1999 (JP) .......................................... 11-129495

(51) Int. Cl.[7] .............................................. G01L 9/00
(52) U.S. Cl. ....................................................... 73/705
(58) Field of Search ............... 73/705, 172; 364/571.02; 430/257, 45; 156/354; 428/36.4; 33/542

(56) References Cited

U.S. PATENT DOCUMENTS

| | | | |
|---|---|---|---|
| 3,469,439 A | | 9/1969 | Roberts et al. |
| 4,003,245 A | | 1/1977 | Ogata et al. |
| 4,104,910 A | | 8/1978 | Ogata et al. |
| 4,878,083 A | * | 10/1989 | Hayakawa et al. ............ 355/27 |
| 5,841,462 A | * | 11/1998 | Matsuo et al. ............... 347/213 |
| 5,973,083 A | * | 10/1999 | Matsushita et al. ......... 526/129 |
| 6,033,987 A | * | 3/2000 | Lin et al. .................... 438/692 |
| 6,094,831 A | * | 8/2000 | Shigyo ........................ 33/542 |

FOREIGN PATENT DOCUMENTS

| JP | 10-170205 | 6/1998 |
|---|---|---|
| JP | 11-325811 | 11/1999 |

OTHER PUBLICATIONS

European Search Report.

"Sealing Fuji Prescale Pressure Sensitive Film for Protection Against Fluid Damage: the effect on its response"; Authors – A.B. Liggins, K. Surry, and J.B. Finlay; *published May 1995.*

"Multicolor Laminate Pressure Feeler Gauge"; Authors – Ronald S. Lipton, Harry Fuerhaupter, Kenneth Storts and Brian Black; *published 1996.*

* cited by examiner

*Primary Examiner*—Hezron Williams
*Assistant Examiner*—Marissa Ferguson
(74) *Attorney, Agent, or Firm*—Sughrue Mion, PLLC

(57) ABSTRACT

A method for measuring a pressure between a pair of pressing surfaces in point or linear contact with each other by utilizing a pressure measuring film which causes a pressurized portion thereof to develop a color in proportion with the pressure applied. An elastic sheet is disposed between the pressing surface having the point/linear contact portion and the pressure measuring film so as to decrease the pressure transmitted and applied to the pressure measuring film. The pressure distribution obtained from the colored image formed on the pressure measuring film is used to determine the actual maximum pressure applied between the pressing surfaces. It is possible to measure the large pressure which falls in or exceeds the measurable pressure range of the pressure measuring film.

13 Claims, 5 Drawing Sheets

METHOD FOR MEASURING PRESSURE HIGHER THAN MEASURABLE RANGE OF PRESSURE MEASURING FILM

FIELD OF THE INVENTION

The present invention relates to a method for measuring a pressure applied between opposing surfaces using a pressure measuring film, particularly a method for measuring a pressure higher than a measurable pressure range of the pressure measuring film. The present invention also relates to a pressure measurement apparatus for direct use in carrying out the method.

BACKGROUND OF THE INVENTION

There is known a method in which a pressure measuring film is disposed between a pair of pressing surfaces to determine the pressure from changes in color formed on the pressure measuring film. The color development depends on the magnitude of the pressure applied. As such pressure measuring film, there is exemplified "Prescale" (tradename) presented by Fuji Photo Film Co., Ltd.

The Prescale comprises microcapsules containing a color former and a color developer coated on the same surface of a support, or on different supports. The microcapsules at the portion subjected to pressure is destroyed to cause the color former released from the ruptured microcapsules to react to the developer so as to develop a predetermined color (e.g., red) by chemical reaction. There are a type in which a microcapsulated color former and a developer are coated on one sheet of support (referred to as the mono-sheet type), and a type in which they are coated to different supports and two supports are overlaid for use (referred to as the two-sheet type).

In the pressure measuring film, since the developed color density increases by pressure increase, the pressure applied can be determined by measuring the developed color density. The pressure measuring film is able to measure different pressure ranges by using microcapsules which have different wall thicknesses to be ruptured upon application of different pressure levels. A plurality of types of pressure measuring films for different measurable pressure ranges are prepared, and the film with an appropriate pressure range is selected and used depending on the pressure to be measured.

However, when the pressure level to be measured is higher than the measurable pressure range of the pressure measuring film, the pressure cannot correctly be measured with this pressure measuring film. For example, the cylinder block and cylinder head of a reciprocating engine (internal combustion engine) with a gasket disposed therebetween are clamped by a cylinder head bolt. When a bonding pressure between the cylinder block and the cylinder head is measured by the pressure measuring film, this pressure becomes larger than the pressure range of the pressure measuring film for the highest pressure use.

In this case, the measurable pressure range of an available pressure measuring film (Prescale) for high-pressure is 50 to 130 MPa (additionally, 1 MPa is nearly equal to 10.2 $kgf/cm^2$), while the bonding pressure of the cylinder block and cylinder head is about 1.8 $ton/cm^2$ (nearly equal to 176.5 MPa). Therefore, even when the pressure measuring film for high-pressure is used, it can only be judged that the detected pressure is higher than the maximum value (130 MPa) of the measurable pressure range. The color density at the portion to which such high pressure is applied reaches up to the maximum density and saturates in this density level. Accordingly, the actual maximum bonding pressure cannot correctly be measured, which is a large obstruction during development of the engine and gasket.

SUMMARY OF THE INVENTION

The present invention has been accomplished in consideration of the above-described situations, and a first object thereof is to provide a pressure measurement method which can measure a pressure higher than a measurable pressure range using a pressure measuring film. Moreover, a second object is to provide a pressure measurement apparatus for direct use in carrying out this method.

To attain the first object, according to the present invention, there is provided a method for measuring a pressure applied between opposing first and second surfaces using a pressure measuring film, the first surface being flatter than the second surface, the second surface having a contact portion to contact with the first surface in point contact or linear contact, comprising steps of:

providing the pressure measuring film between said first and second surfaces, the pressure measuring film causing a pressurized portion thereof to develop a color;

disposing an elastic sheet between said second surface and said pressure measuring film;

applying the pressure between said first and second surfaces while holding said pressure measuring film and said elastic sheet therebetween;

detecting a colored image formed on said pressure measuring film to obtain a pressure distribution curve; and determining a maximum pressure applied between said first and second surfaces based on the pressure distribution curve;

wherein the pressure applied to said pressure measuring film is decreased as compared with the case in which the elastic sheet is not used.

The point or linear contact portion on the second surface does not restrictedly mean the point or linear shape, and of course has a certain degree of area. For example, for the gasket disposed between the cylinder block and cylinder head of the engine, a protrusion disposed along a circle surrounding a cylinder periphery forms the linear contact portion. And the top surface of the gasket including the protrusion constitutes the second surface of the present invention. The bottom surface of the cylinder head onto which the protrusion is abutted and pressed constitutes the first surface of the present invention. Specifically, one of the pressing surfaces disposed opposite to each other is flatter than the other, and this one (i.e., the first surface) is abutted and contacted with the other pressing surface (i.e., the second surface) in an acute manner. For example, when a sheet is held between both pressing surfaces, and when the contact area of the other pressing surface and the sheet is smaller than the contact area of one flatter pressing surface and the sheet, the pressure measurement method of the present invention can be applied.

As the pressure measuring film for use herein, a film can be used which is obtained by forming a layer of a microcapsulated color former and a layer of a color developer on a support (film). By application of pressure, the microcapsules are destroyed to release the color former from the ruptured microcapsules. The released color former is adsorbed to the developer and a color is developed by chemical reaction. For example, "Prescale" (tradename) sold by Fuji Photo Film Co., Ltd. can be used.

By reading a colored image formed on the pressure measuring film, the density distribution on a line crossing the colored image which corresponds to the contact portion of point or linear contact is measured to obtain the pressure distribution along the crossing line. The maximum pressure $P_H$ between the pressing surfaces can be obtained by using the area $S_E$ surrounded by the pressure distribution curve and the contact length L of the contact portion. Here, the area $S_E$ surrounded by the pressure distribution curve is considered to correspond to the work amount (pressure× compression amount) by pressing, or to the amount obtained by integrating this work amount by a coefficient for correcting the influence by an elastic sheet. Consequently, the maximum pressure applied between the pressing surfaces can be determined using this area $S_E$ and contact length L. For example, the maximum pressure $P_H$ may be determined so that the following relationship is satisfied:

(contact length)×(maximum pressure)=area $(L \times P_H = S_E)$

The contact length L used herein may be detected from the colored image obtained when the same pressure measuring film (second pressure measuring film) is held and pressed between the pressing surfaces without using any elastic sheet. The contact length L may also be obtained as follows. The pressure measuring films of the same standard are held between both surfaces of the elastic sheet and two pressing surfaces, and the contact length L is obtained from the colored image formed on the pressure measuring film (second pressure measuring film) which directly contacts to the point/linear contact portion of the pressing surface (second surface).

The pressure measuring film (second pressure film) having the same characteristics as that of the above-described pressure measuring film (first pressure measuring film) is pressed between the pressing surfaces without using the elastic sheet, and a second pressure distribution curve F may be obtained from the resulting color development state. When the pressure distribution curve is obtained from the colored image formed on the pressure measuring film by using the elastic sheet as described above and the thus obtained curve is used as a first pressure distribution curve E, the aimed maximum pressure can be obtained by enlarging or extrapolating the second pressure distribution curve toward the maximum value so that the area $S_F$ surrounded by the enlarged second pressure distribution curve substantially becomes the same as the area $S_E$ of the first pressure distribution curve.

Alternatively, the respective pressure measuring films may be held and pressed between both sides of the elastic sheet and two pressing surfaces. The pressure measuring film coming in contact with the point/linear contact portion of the second pressing surface is used as the second pressure measuring film, and the other film can be used as the first pressure measuring film. In this arrangement, since the necessary pressure distribution curves can be obtained by once pressing the first and second pressure measuring films between the pressing surfaces, measurement precision is enhanced.

A hard rubber sheet may be used as the elastic sheet, but when the pressure is particularly large, hard glass epoxy resin having less elastic deformability than that of hard rubber may be used. If between both the pressing surfaces, the pressure applied from the second pressing surface including a more acutely protruded contact portion is dispersed in the elastic sheet, and the pressure transmitted and applied to the pressure measuring film is reduced, such sheet can be used as the elastic sheet in the pressure measurement method of the present invention.

To attain a second object, there is provided a pressure measurement apparatus for use in the method described above, the apparatus comprising:

a scanner for reading the colored image formed on a pressure measuring film to which a pressure is applied to develop color;

a first memory for storing the image read by the scanner;

an image cutout section for obtaining an image on a line crossing a contact portion of point contact or line contact from the read image;

a converter for obtaining a pressure distribution from the image cut out by the image cutout section;

a second memory for storing the pressure distribution obtained by the converter;

a processor for using the pressure distribution stored in the second memory to obtain a maximum pressure applied between surfaces; and an output means for outputting an operation result obtained by the processor.

BRIEF DESCRIPTION OF THE DRAWINGS

FIG. 6A is a diagram showing the arrangement of the respective films and other member; FIG. 6B is a diagram showing a pressure distribution curve E detected from the first pressure measuring film 18; FIG. 6C is a diagram showing a pressure distribution curve F detected from the second pressure measuring film 40; and FIG. 6D is a diagram showing a method of using both curves E and F to obtain the aimed maximum pressure $P_H$.

DETAILED DESCRIPTION OF THE PREFERRED EMBODIMENTS

Figure 1:
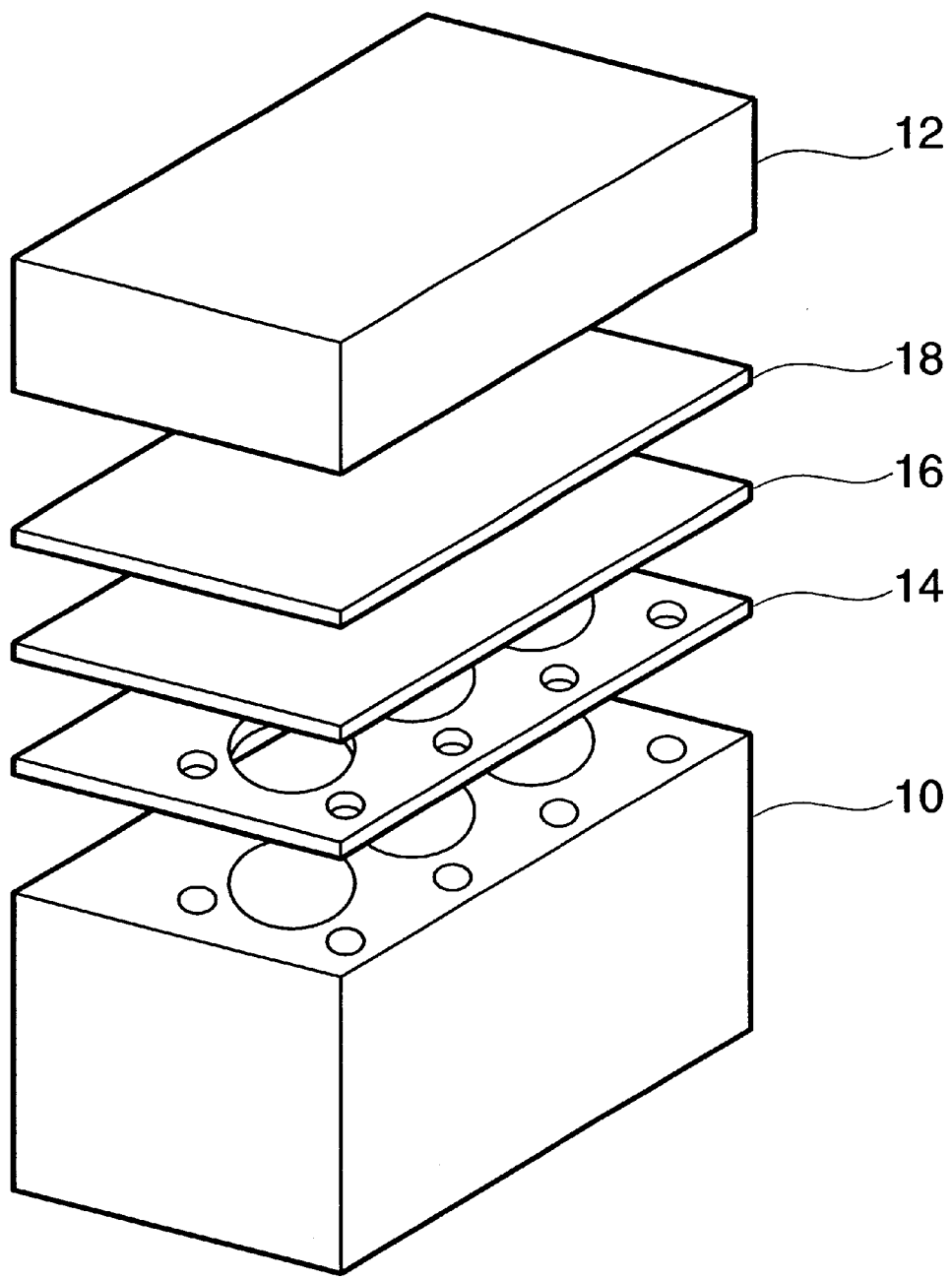
FIG. 1 is an exploded perspective view showing that the method of the present invention is used to perform the cylinder head clamping pressure measurement of an engine.
Figure 2:
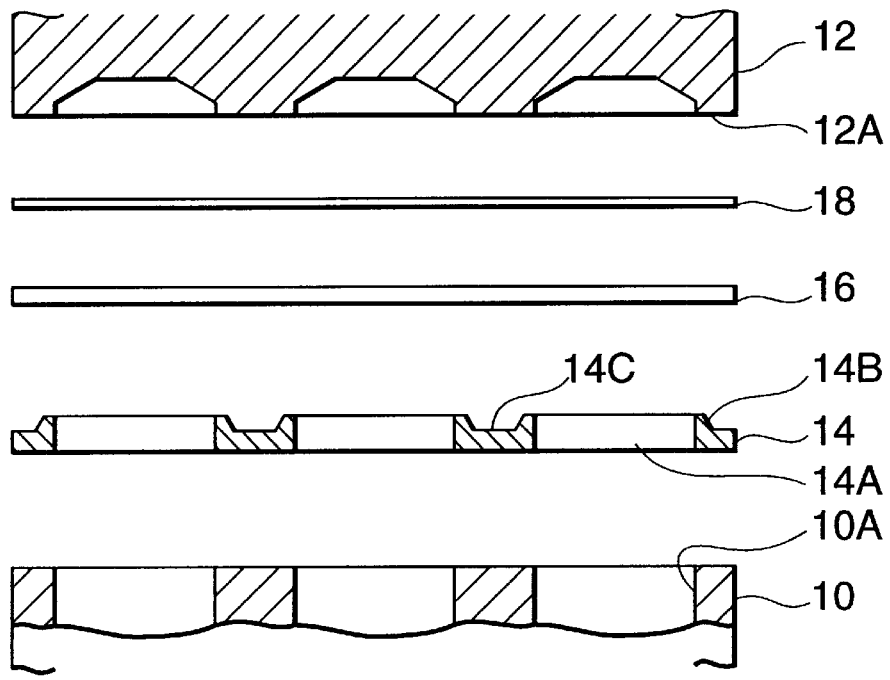
FIG. 2 is an exploded sectional view of the cylinder head of FIG. 1.
Figure 3:
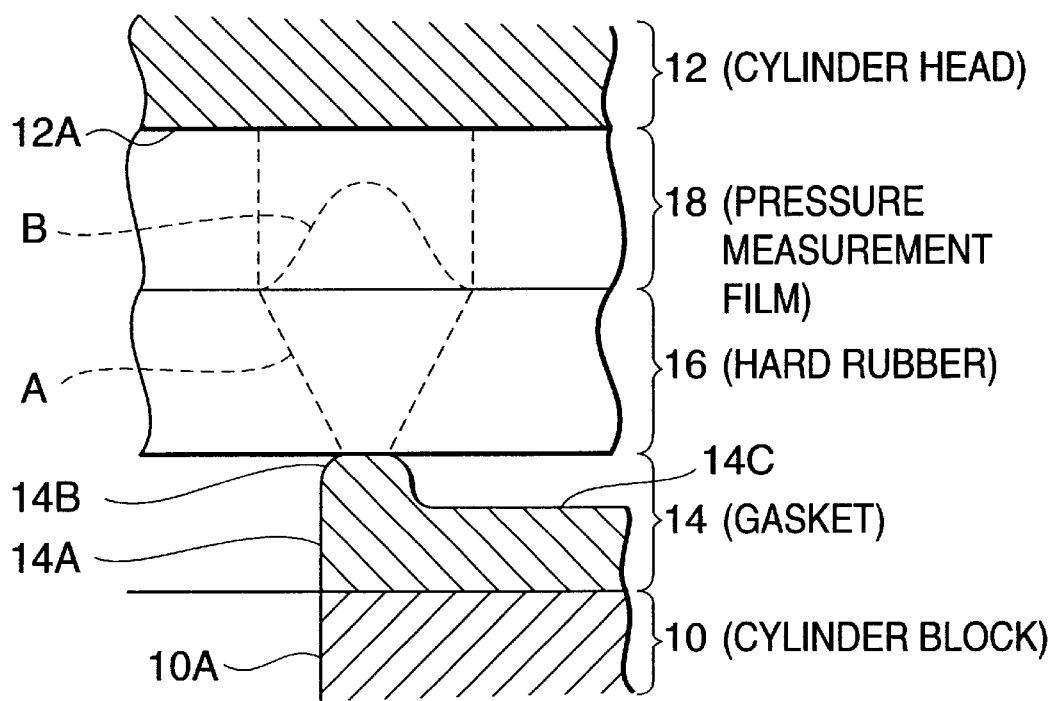
FIG. 3 is an enlarged sectional view showing that a pressure measuring film and an elastic sheet are disposed and pressed between the cylinder head and gasket.

In FIGS. 1 to 3, a cylinder block 10 of a reciprocating engine, and a cylinder head 12 are firmly clamped and fixed to each other by a cylinder head bolt (not shown) via a gasket 14. In the gasket 14, as shown in FIGS. 2, 3, circular openings 14A are formed facing to respective cylinders 10A, while a circular protrusion 14B is disposed along the peripheral edge of the opening 14A on the top surface (the surface facing to the cylinder head 12).

The protrusion 14B forms a linear contact portion in the present invention, and this protrusion 14B is strongly pressed against the under surface 12A of the cylinder head 12 to prevent the leakage of the internal pressure from the combustion chamber. Therefore, the under surface 12A of the cylinder head 12 and the top surface 14C of the gasket 14 forms first and second pressing surfaces in the present invention, respectively.

In the present invention, an elastic sheet 16 and a pressure measuring film 18 are laid on the top surface 14C of the gasket 14, finally the cylinder head 12 is laid and the whole assembly is strongly clamped and bonded by the cylinder head bolt (not shown). The elastic sheet 16 is a sheet formed of hard rubber, epoxy resin reinforced by glass fiber (glass epoxy resin), and the like, and a sheet with an appropriate elasticity and thickness is selected depending on the magnitude of a clamping force (that is, a pressing force) applied between pressing surfaces 14C and 12A.

As the pressure measuring film, for example, a film obtained by coating a microcapsulated color former and a color developer on a support (film) can be used. As such film, "Prescale" (tradename) presented by Fuji Photo Film Co., Ltd. is suitable. This film includes a mono-sheet type in which a layer of microcapsules containing the color former and a layer of the color developer are overlaid and coated on one sheet of support, and a two-sheet type in which both are separately applied to the supports and the supports are overlaid during use to join the microcapsulated color former to the developer. Either type can be used in the present invention.

By bonding the cylinder head 12 to the cylinder block 10 via the elastic sheet 16 and pressure measuring film 18, the elastic sheet 16 and pressure measuring film 18 are pressed between two pressing surfaces 14C and 12A. At this time, the protrusion 14B of the gasket 14 presses the elastic sheet 16 in a concentrated manner, and the pressure is diffused and transmitted to the pressure measuring film 18 as shown by a dotted line A of FIG. 3. The pressure applied to the pressure measuring film 18 is dispersed and the pressure distribution is substantially in a round mountain shape as shown by a dotted line B.

Figure 4A:
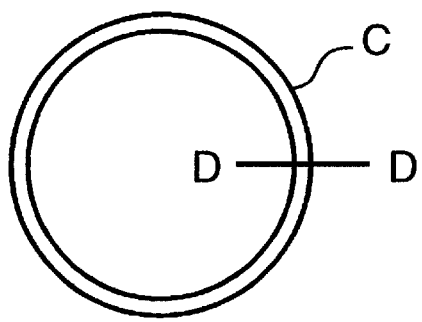
FIG. 4A is a diagram showing a colored image formed on the pressure measuring film.

As a result, on the pressure measuring film 18, a circular color development pattern or colored image C appears along the periphery of the cylinder 10A as shown in FIG. 4A. The hardness and thickness of the elastic sheet 16 are set so that the pressure (per unit area) applied to the pressure measuring film 18 enters the measurable pressure range of the film 18.

Figure 4B:
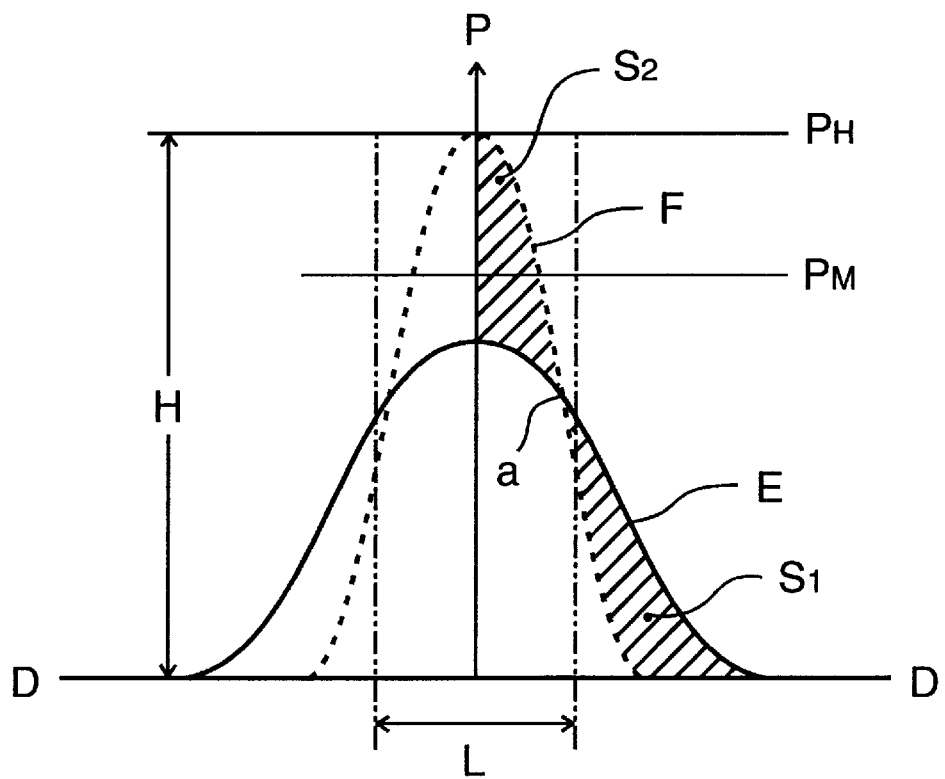
FIG. 4B is a diagram showing a pressure distribution curve E obtained from an image taken along line D—D of FIG. 4A and one example of a method for determining a maximum pressure.
Figure 5:
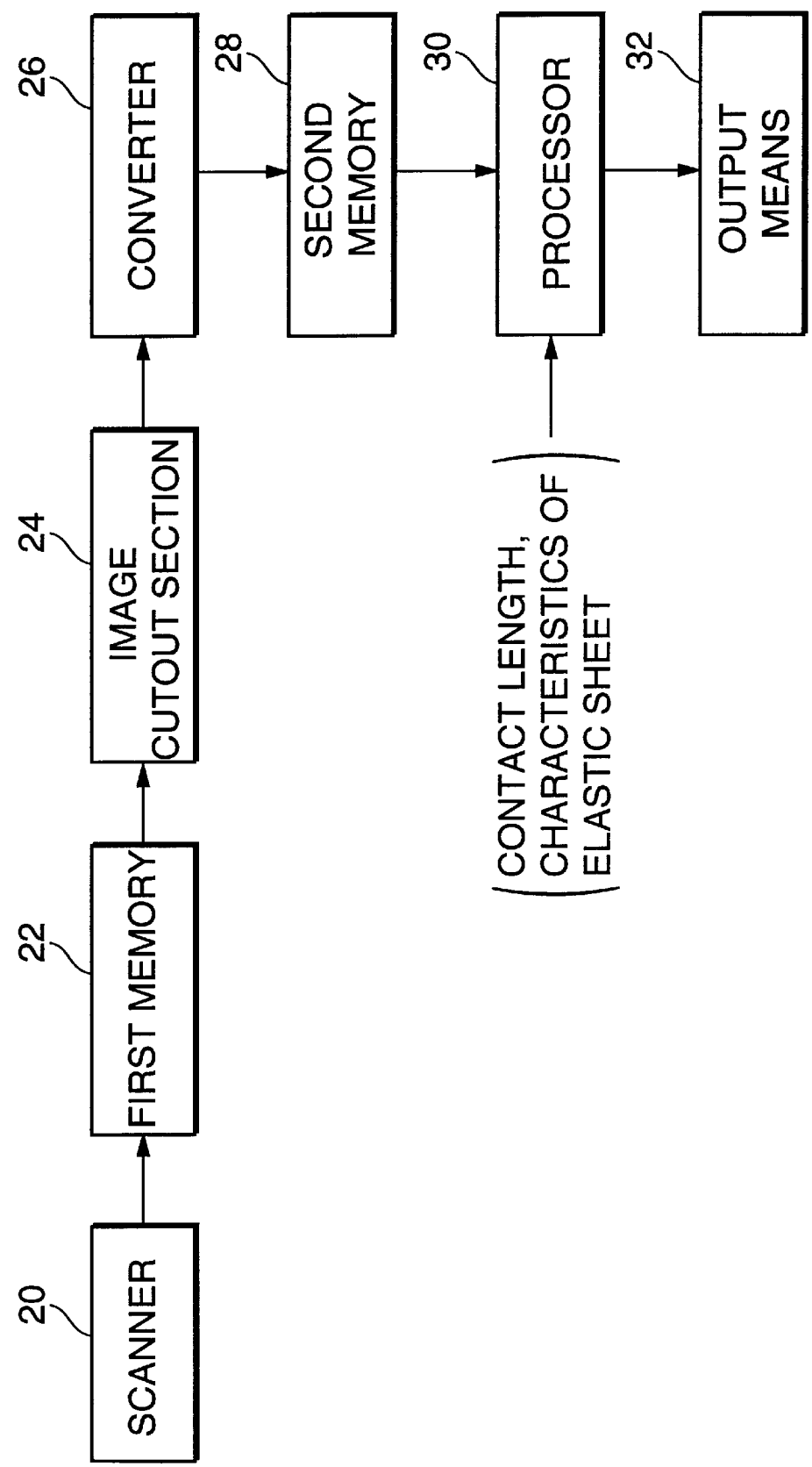
FIG. 5 is a block diagram showing the constitution example of a pressure measurement apparatus.

The density distribution of the colored image C is read by a scanner 20 shown in FIG. 5. The read image is stored in a first memory 22. The image running along a straight line D—D crossing the colored image C is cut out from the read image by an image cutout section 24. A converter 26 converts the color density into the pressure value using a separately prepared table or calibration graph which shows the relationship between the color density and the pressure applied to the pressure measuring film, and obtains a pressure distribution E (FIG. 4B) along the straight line D—D from the density change of the cut out image. The obtained pressure distribution is stored in a second memory 28. In FIG. 4B the abscissa D—D indicates the coordinate of the length direction of the crossing line D—D shown in FIG. 4A, and the ordinate P indicates the pressure.

A processor 30 determines the aimed maximum pressure from this pressure distribution curve E by using the contact length L of the protrusion (linear contact portion) 14B of the gasket 14 in the direction of the crossing line D—D. It is assumed that the area $S_E$ surrounded by the pressure distribution curve E and the abscissa D—D substantially corresponds to the work amount by pressing, which is a product of the pressure and displacement. Therefore, when a maximum pressing force $P_H$ is represented by a height H in the distribution curve E, the height H can be calculated by the formula of $S_E = L \times H$. This height value H corresponds to the maximum pressure $P_H$. Although the area $S_E$ is not clearly described in FIG. 4B, the area $S_E$ is seen in FIG. 6B.

As a result, it is possible to obtain the maximum pressing force $P_H$ which is larger than the maximum pressure $P_M$ of the measurable pressure range of the pressure measuring film 18. By inputting the contact length L in an appropriate method, and setting the area of a rectangle L×H to be equal to $S_E$, the height H is obtained. In this case, the correction coefficient indicating the influence by the thickness and hardness of the elastic sheet 16 may be added to the above described formula.

Alternatively, the height H may be obtained in other methods. For example, the state of diffusion of the pressure applied to the elastic sheet 16 from the protrusion (linear contact portion) 14B changes, for example, by the thickness, hardness and other characteristics of the elastic sheet 16. Therefore, conversely, when the thickness, hardness, and other characteristics of the elastic sheet 16 are known, the actual pressure distribution curve F at the position of the protrusion 14B can be estimated from the detected pressure distribution curve E. FIG. 4B shows this estimated pressure distribution curve F.

In the estimation, an intersection of the curves E and F is set as a, and a slant-line area $S_1$ held between the curves E and F below this intersection a is set to be equal to a slant-line area $S_2$ held between the curves E and F above the intersection a. At this time, an appropriate correction coefficient may be added to perform correction. The maximum pressing force $P_H$ obtained in this manner is transferred to an output means or device 32, such as a display or a printer for outputting the maximum pressure $P_H$.

Second Embodiment

In the above-described first embodiment, the maximum pressure $P_H$ is obtained based on the contact length L and the characteristics of the elastic sheet 16, but another pressure measuring film (second pressure measuring film) 40 of the same standard as that of the pressure measuring film 18 may be used to estimate the maximum pressure $P_H$. In this case, the pressure measuring film 18 is used as the first pressure measuring film in the second embodiment as described hereinafter.

Figure 6A:
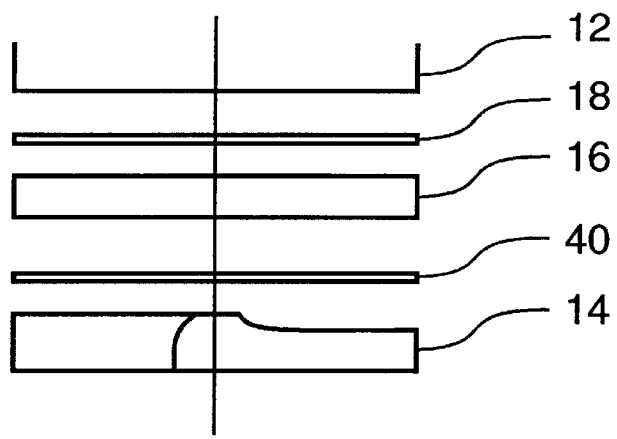
FIGS. 6A to 6D are diagrams showing a method of disposing first and second pressure measuring films on both sides of the elastic sheet to perform pressure measurement.
Figure 6B:
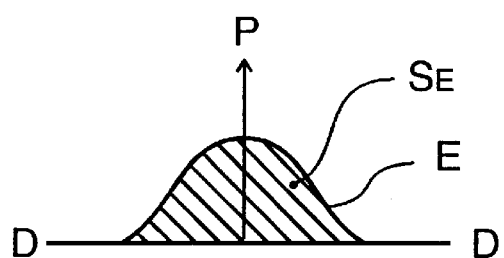
Figure 6C:
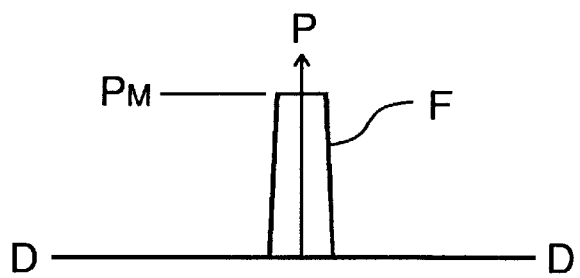
Figure 6D:
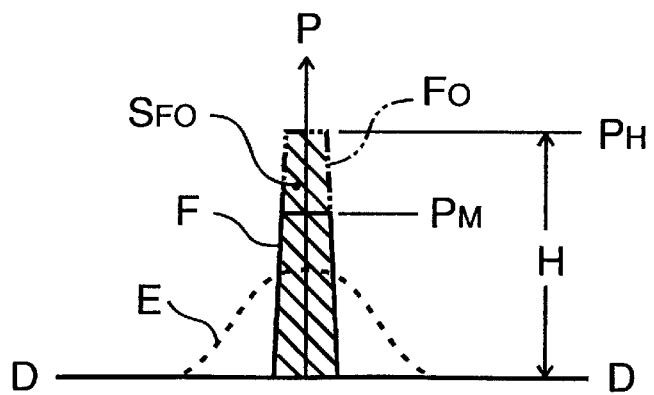

FIGS. 6A to 6D are diagrams showing a method of using the first and second pressure measuring films 18, 40 to perform pressure measurement. FIG. 6A is a diagram showing the arrangement of the respective films 18, 40, FIG. 6B is a diagram showing the pressure distribution curve E detected from the first pressure measuring film 18, FIG. 6C is a diagram showing the pressure distribution curve F detected from the second pressure measuring film 40, and FIG. 6D is a diagram showing a method of using both curves E and F to obtain the maximum pressure $P_H$. In FIGS. 6B, 6C, 6D, the abscissa D—D indicates the position along the straight line which crosses the color development pattern, and the ordinate indicates the pressure P. As apparent from FIG. 6C, the second pressure distribution curve F shows the pressure up to the maximum pressure $P_M$ of the measurable pressure range of the second pressure measuring film 40.

Here, the second pressure measuring film 40 is held between the gasket 14 and the elastic sheet 16, and pressed together with the first pressure measuring film 18, and the color development pattern is simultaneously formed. Subsequently, these color development patterns are read by the scanner 20 shown in FIG. 5 and stored in the first memory 22. The image cutout section cuts out the image of the position corresponding to the same crossing line D—D from this image, and the respective pressure distributions are obtained by the converter 26 and stored in the second memory 28.

The processor 30 overlaps two pressure distribution curves E and F as shown in FIG. 6D, and enlarges or expands the shape of the curve F upward. At this time, the shape of an expanded curve $F_O$ is determined so that the area $S_{FO}$ surrounded by the expanded curve $F_O$ and abscissa D—D substantially agrees with the area $S_E$ surrounded by the first pressure distribution curve E and abscissa D—D. The height H of the upwardly-expanded second pressure distribution curve $F_O$ indicates the maximum pressure $P_H$.

When the second pressure measuring film 40 is pressed simultaneously with the first pressure measuring film 18 in this manner, it is possible to set the pressure in total applied to the films 40, 18 to be the same and enhance the measurement precision. However, by separately pressing both films 40, 18, the respective color development patterns may separately be obtained. In this case, it is of course necessary to change the gasket 14 and set the same clamping force. When the gasket 14 is pressed, this method is not appropriate because the gasket 14 is deformed by pressing and it is difficult to provide the same clamping force, but the method is appropriate when the pressure between the pressing surfaces is measured by a press apparatus in which the pressing force is always constant without using the gasket or other deformable materials.

As described above, according to the present invention, the pressure applied to the pressure measuring film is placed in the measurable pressure range by holding and pressing the elastic sheet between the pressing surface having the point/linear contact portion and the pressure measuring film. With such a constitution, the pressure distribution obtained from the colored image formed on the pressure measuring film is used to determine the maximum pressure applied between the pressing surfaces. Accordingly, it is possible to measure the large pressure which falls in or exceeds the measurable pressure range of the pressure measuring film.

For the pressure measuring film used herein, the film whose color development state (e.g., color and density) changes with respect to the magnitude of the pressing force is suitable. For example, the film obtained by applying the microcapsulated color former and the color developer to one sheet of support or separate sheets of supports is convenient for handling. There can be various methods of obtaining the maximum pressure from the color development state of the pressure measuring film. For example, by obtaining the pressure distribution on the line crossing the contact portion from the color development state of the film, and using the area $S_E$ of the pressure distribution curve and the contact length L on the same line crossing the contact portion, the maximum pressure $P_H$ can be calculated by the following equation: $S_E = L \times P_H$. The maximum pressure $P_H$ can relatively easily be estimated according to the method.

Since the contact length L is assumed to be substantially determined by the shape of the contact portion and material of the elastic sheet, the pressing force, etc., the contact length can be inputted as a predetermined constant value in advance. However, in the case in which the pressing can be repeated with a constant pressing force, this contact length L may be obtained from the colored image formed on the second pressure measuring film which is held and pressed between the pressing surfaces without using the elastic sheet, and the measurement precision is enhanced in this case. For the second pressure measuring film used in this case, when the film having the same characteristics as that of the pressure measuring film (first pressure measuring film) for pressing via the elastic sheet is used, the measurement precision is further enhanced.

By holding and pressing the pressure measuring films of the same standard on both sides of the elastic sheet, obtaining the contact length L from the colored image formed on pressure measuring film (second pressure measuring film) which contacts to the protruded contact portion of the pressing surface, and obtaining the area $S_E$ from the other pressure measuring film (first pressure measuring film), the maximum pressure $P_H$ can be detected. In this case, since the color development pattern can be formed on both films by single pressing operation, the measurement precision is further enhanced.

Instead of the method of obtaining the contact length L and calculating the maximum pressure $P_H$ from the equation $S_E = L \times P_H$, the method may comprise comparing the respective pressure distribution curves E, F detected by the first and second pressure measuring films to obtain the maximum pressure $P_H$. For example, by enlarging the second pressure distribution curve F toward the maximum pressure until the area $S_{FO}$ of the enlarged curve $F_O$ substantially becomes the same as the area $S_E$ of the first pressure distribution curve E, the maximum pressure can be estimated from the height of the enlarged second pressure distribution curve $F_O$. In this case, since the pressure distribution exceeding the measurable pressure range of the pressure measuring film is obtained by increasing the height on the basis of the second pressure measurement curve F, the precision is further enhanced.

The second pressure measuring film may be pressed without using the elastic sheet, but the first and second pressure measuring films may be overlaid on both sides of the elastic sheet and simultaneously pressed. Also in this case, since the pressing conditions for both films are the same, the precision is further enhanced, and additionally the operation is facilitated.

For the elastic sheet, a hard rubber sheet is easily obtainable and convenient, but harder sheets such as a glass epoxy resin sheet are also suitable depending on the pressure range to be measured. Moreover, according to the present invention, the pressure measurement apparatus for direct use in carrying out the method of the present invention can be obtained.

What is claimed is:

1. A method for measuring a pressure applied between opposing first and second surfaces using a pressure measuring film, the first surface being flatter than the second surface, the second surface having a contact portion to contact with the first surface in point contact or linear contact, the method comprising steps of:

providing the pressure measuring film between said first and second surfaces, the pressure measuring film causing a pressurized portion thereof to develop a color;

disposing an elastic sheet between said second surface and said pressure measuring film;

applying the pressure between said first and second surfaces while holding said pressure measuring film and said elastic sheet therebetween, the pressure applied to said pressure measuring film being decreased as compared with a case in which the elastic sheet is not used;

detecting a colored image formed on said pressure measuring film to obtain a pressure distribution curve; and determining a maximum pressure applied between said first and second surfaces based on the pressure distribution curve.

2. The method according to claim 1, wherein in said step of applying the pressure between said first and second surfaces while holding said pressure measuring film and said elastic sheet therebetween, a measurable pressure range of said pressure measuring film is lower than the maximum pressure applied between said first and second surfaces, and the pressure applied to said pressure measuring film is placed into the measurable pressure range by disposing the elastic sheet intervened between said second surface and said pressure measuring film.

3. The method according to claim 1, further comprising:
obtaining said pressure distribution curve from a density distribution along a crossing line which crosses the colored image formed on the pressure measuring film; and
calculating the maximum pressure applied between the first and second surfaces by the following formula:

$$P_H = S_E/L$$

in which $P_H$ is the maximum pressure applied between the first and second surfaces;
$S_E$ is an area surrounded by said pressure distribution curve; and
L is a contact length which is a length of the contact portion of the second surface to the first surface and is along said crossing line.

4. The method according to claim 3, further comprising detecting said contact length of the contact portion from a colored image formed on a second pressure measuring film which is disposed and pressed between the first and second surfaces without using any elastic sheet.

5. The method according to claim 3, further comprising:
disposing a second pressure measuring film between said first surface and said elastic sheet and applying the pressure between the first and second surfaces while holding said pressure measuring film, said elastic sheet and said second pressure measuring film therebetween; and
obtaining said contact length of the contact portion from a colored image formed on said second pressure measuring film.

6. The method according to claim 1, further comprising:
providing a second pressure measuring film, which has characteristics same as that of said pressure measuring film, between the first and second surfaces;
applying the pressure between the first and second surfaces while holding the second pressure measuring film therebetween;
detecting a colored image formed on the second pressure measuring film to obtain a second pressure distribution curve, said second pressure distribution curve being enlarged toward the maximum value of a pressure measurement range so that an area surrounded by the enlarged second pressure distribution curve is equal to an area surrounded by said pressure distribution curve; and
reading a height value of the enlarged second pressure distribution curve as the maximum pressure applied between the first and second surfaces.

7. The method according to claim 1, further comprising:
disposing a second pressure measuring film, which has characteristics same as that of said pressure measuring film, between the first surface and said elastic sheet, and applying the pressure between the first and second surfaces while maintaining said first pressure measuring film, the elastic sheet and said second pressure measuring film therebetween;
obtaining a second pressure distribution curve from a colored image formed on the second pressure measuring film, said second pressure distribution curve being enlarged toward the maximum value of a pressure measurement range so that an area surrounded by the enlarged second pressure distribution curve is equal to an area surrounded by said pressure distribution curve; and
reading a height value of the enlarged second pressure distribution curve as the maximum pressure applied between the first and second surfaces.

8. The method according to claim 1, wherein in said step of providing the pressure measuring film between said first and second surfaces, said pressure measuring film comprises a color developer and microcapsules containing a color former coated on the same surface of a support, and wherein the color former released from the microcapsules ruptured by an application of a pressure is absorbed to the developer so as to develop a color, and an optical density of developed color increases in proportion with the pressure applied.

9. The method according to claim 1, wherein in said step of providing the pressure measuring film between said first and second surfaces, said pressure measuring film comprises a layer of microcapsules containing a color former coated on a support, and a layer of a color developer coated on a different support so as to oppose the layer of microcapsules; and wherein the color former released from the microcapsules ruptured by an application of a pressure is adsorbed to the developer so as to develop a color, and an optical density of developed color increases in proportion with the pressure applied.

10. The method according to claim 1, wherein in said step of disposing the elastic sheet between said second surface and said pressure measuring film, the elastic sheet is a hard rubber sheet.

11. A pressure measurement apparatus for use in the method of claim 1, the apparatus comprising:
a scanner for reading the colored image formed on a pressure measuring film to which a pressure is applied to develop color;
a first memory for storing the image read by the scanner;
an image cutout section for obtaining an image on a line crossing a contact portion of point contact or linear contact from the read image;
a converter for obtaining a pressure distribution from the image cut out by the image cutout section;
a second memory for storing the pressure distribution obtained by the converter;
a processor for using the pressure distribution stored in the second memory to obtain a maximum pressure applied between surfaces; and
an output means for outputting an operation result obtained by the processor.

12. A method for measuring a pressure applied between opposing first and second surfaces using a pressure measuring film, the first surface being flatter than the second surface, the second surface having a contact portion to contact with the first surface in point contact or linear contact, the method comprising steps of:
providing a first pressure measuring film between said first and second surfaces, the first pressure measuring film causing a pressurized portion thereof to develop a color;

disposing an elastic sheet between said second surface and said first pressure measuring film;

applying the pressure between said first and second surfaces while holding said first pressure measuring film and said elastic sheet therebetween;

detecting a colored image formed on said first pressure measuring film to obtain a first pressure distribution curve;

providing a second pressure measuring film, which has characteristics same as that of said first pressure measuring film, between the first and second surfaces;

applying the pressure between the first and second surfaces while holding the second pressure measuring film therebetween, without using said elastic sheet;

detecting a colored image formed on the second pressure measuring film to obtain a second pressure distribution curve, said second pressure distribution curve being enlarged toward the maximum value of a pressure measurement range so that an area surrounded by the enlarged second pressure distribution curve is equal to an area surrounded by said first pressure distribution curve; and reading a height value of the enlarged second pressure distribution curve as the maximum pressure applied between the first and second surfaces.

13. A method for measuring a pressure applied between opposing first and second surfaces using a pressure measuring film, the first surface being flatter than the second surface, the second surface having a contact portion to contact with the first surface in point contact or linear contact, the method comprising steps of:

disposing an elastic sheet between said first and second surfaces;

disposing a first pressure measuring film between said first surface and said elastic sheet, the first pressure measuring film causing a pressurized portion thereof to develop a color;

disposing a second pressure measuring film, which has characteristics same as that of said first pressure measuring film, between said elastic sheet and said second surface;

applying the pressure between said first and second surfaces while holding said first pressure measuring film, said elastic sheet and said second pressure measuring film therebetween;

detecting a colored image formed on said first pressure measuring film to obtain a first pressure distribution curve;

detecting a colored image formed on said second pressure measuring film to obtain a second pressure distribution curve, said second pressure distribution curve being enlarged toward the maximum value of a pressure measurement range so that an area surrounded by the enlarged second pressure distribution curve is equal to an area surrounded by said first pressure distribution curve; and reading a height value of the enlarged second pressure distribution curve as the maximum pressure applied between the first and second surfaces.

* * * * *